United States Patent
Kost

[15] 3,648,812
[45] Mar. 14, 1972

[54] FLUID OPERATED COUPLING WITH RADIALLY GUIDED FRICTION SEGMENTS

[72] Inventor: Erwin Kost, Osterath, Germany
[73] Assignee: Schloemann Aktiengesellschaft, Dusseldorf, Germany
[22] Filed: June 8, 1970
[21] Appl. No.: 44,257

[30] Foreign Application Priority Data
June 11, 1969 Germany..................P 19 29 521.7

[52] U.S. Cl..............................192/88 B, 188/335, 188/367
[51] Int. Cl.........................................................F16d 25/04
[58] Field of Search..................192/88 B; 188/367, 335, 340

[56] References Cited
UNITED STATES PATENTS 2,710,087  6/1955  Picard.................................192/88 B
2,229,922  1/1941  Heinze.................................192/88 B
2,695,697  11/1954  Stoeckicht..........................192/88 B

FOREIGN PATENTS OR APPLICATIONS 630,719  6/1936  Germany.............................192/88 B Primary Examiner—Benjamin W. Wyche
Attorney—Holman & Stern

[57] ABSTRACT

A radially adjustable friction clutch or brake that can be engaged and disengaged hydraulically between two members so mounted as to be rotatable relatively to one another, comprising a cylindrical resilient clamping sleeve extending between two coaxial cylindrical boundary pieces, and forming, with a cylindrical body which carries it, an annular chamber to be actuated by liquid under pressure, the side of the resilient clamping sleeve that faces the wall surface of one of the members to be clamped being provided with annularly arranged clamping segments separated from one another by longitudinally extending gaps.

5 Claims, 4 Drawing Figures

PATENTED MAR 14 1972

INVENTOR.
ERWIN KOST.
BY Holman, Glascock,
Downing & Seebold
ATTORNEYS

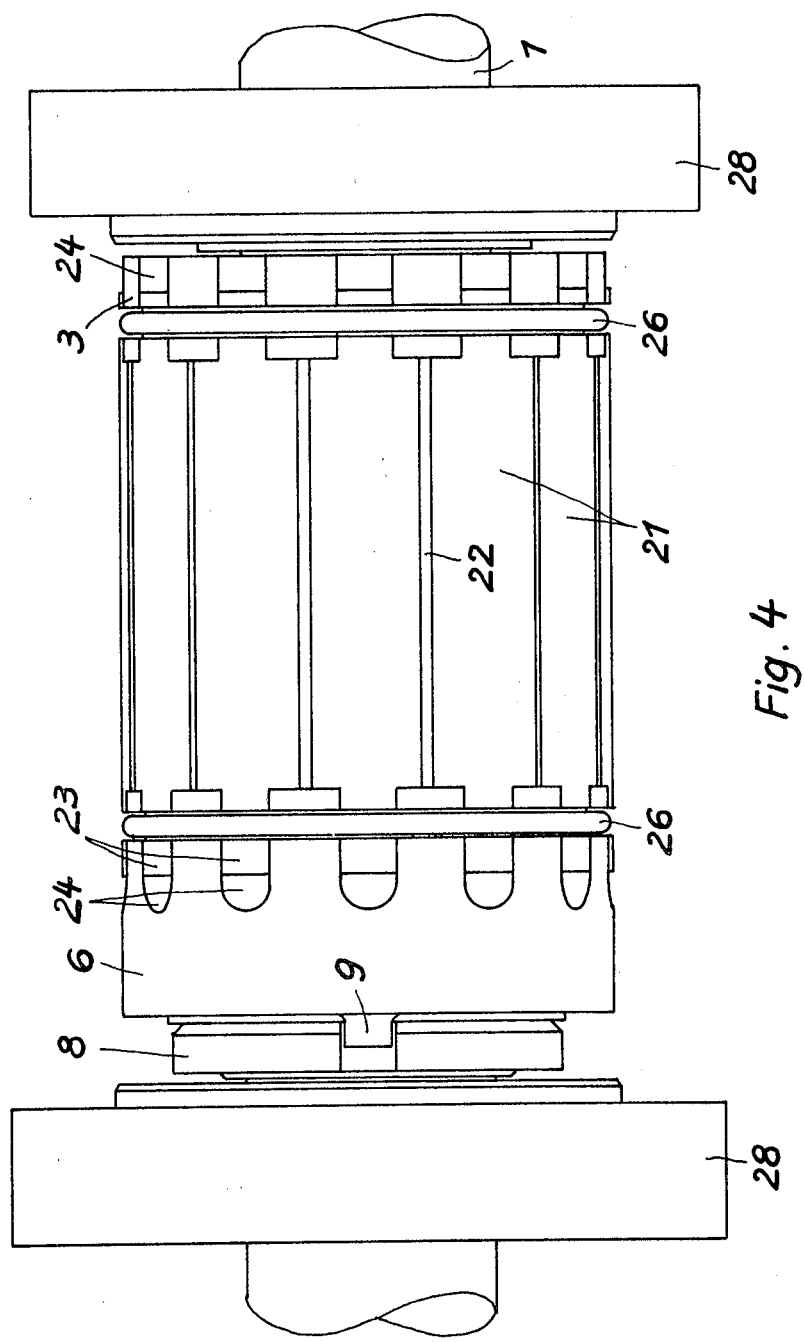

3,648,812

FLUID OPERATED COUPLING WITH RADIALLY GUIDED FRICTION SEGMENTS

BACKGROUND OF THE INVENTION

This invention relates to the adoption of a clamping element that is known for the clamping and holding of tubes in tube-testing presses as a radially adjustable friction clutch or brake, capable of being engaged and disengaged hydraulically, between two members so mounted as to be rotationally movable relative to one another.

These clamping elements consist of a cylindrical resilient sleeve, which is arranged axially between two cylindrical boundary pieces, and forms, with a cylindrical body carrying it, an annular chamber, to be supplied with pressure liquid, and, on the side adjacent to the wall of one of the members to be clamped, annularly arranged clamping segments are provided, with axial gaps therebetween.

Friction clutches, including clutches closable pneumatically or with other fluids are known, in which a hose pipe, expansible by fluid pressure couples together two clutch members that are rotatable relatively to one another, with the torque being transmitted to the frictional surface of the member to be coupled through friction jaws individually secured to the hose pipe. The friction jaws are secured to the hose by means of bolts located in axial bores in the hose surface. A crossbar, which engages in a groove located in a rubber coating and which is welded to foot plates, is to assist the bolts in their resistance to displacement of the friction jaws upon the hose by torque action.

Upon closure of the clutch, the friction jaws are held by axially located rods, the ends of which are supported, for the transmission of the torque, in side rings enclosing the hose or a membrane. These rods are guided in the friction jaws in a passage in which they can move radially against spring pressure. Furthermore, the individual friction jaws are provided with lips projecting in a peripheral direction, which extend into corresponding recesses in the adjacent friction jaw. This overlapping is to serve for giving the friction jaws a better mutual guidance, and, above all to guard against a direct spark transmission from the wearing brake jaws to the readily combustible rubber hose.

It is a disadvantage of these clutches that they have a comparatively large diameter, and therefore a large moment of inertia ($GD^2$). Furthermore, the build up and design is complicated and expensive, and there is a risk that with the large torques to be transmitted, and therefore correspondingly high pressures in the pressure medium, the rubber hose may force its way into the gaps remaining between the friction jaws and may rapidly wear out.

The object of the invention is therefore to provide a hydraulically controllable friction clutch of simple construction, which can transmit large torques, in consequence of high hydraulic pressures, while presenting a small moment of inertia ($GD^2$) in consequence of its small overall size, and having short switching times.

SUMMARY OF THE INVENTION

According to the invention, this object is attained by adopting the clamping elements known in tube-testing presses for holding tubes as a radially adjustable friction clutch capable of being closed and opened hydraulically, by the feature that the clamping segments themselves are constructed as tappet or catch segments, and comprise on their end faces driving tappets or catches which engage in a radially movable manner in recesses in the boundary pieces, which bear axially on the resilient clamping sleeve, and wherein the boundary pieces are connected rotationally fast with the one of the driving or driven rotationally mounted bodies, and wherein further the axial gaps between the clamping segments are covered, relatively to the clamping sleeve, by T-shaped sections located with the flange bearing on the clamping sleeve and with the web engaged between the clamping segments.

In a further development of the invention, the clamping segments and the driving tappets consist of a member wherein the driving tappets engage in a radially movable manner, like fitting keys, in recesses constructed as keyways in the boundary pieces.

In consequence of the clamping segments being integral with the driving tappets, a simple and uncomplicated construction of the clutch is ensured. In consequence of the axial gaps located between the clamping segments being covered relatively to the clamping sleeve by T-shaped sections, a very high pressure may be exerted upon the clamping sleeve, without there being a risk that the sleeve will, in this way, be forced into the gaps and wear out rapidly. Furthermore, with penetration of the sleeve material into the gaps, the functioning of the tappet segments would be influenced by the fact that the clamping segments could no longer return into their original smaller position as an annular form. By employing the clamping sleeve, which is axially sealed by boundary pieces, instead of a hose, and by the simple construction of the clamping segments, a substantially smaller diameter of the clutch is attained than with hitherto known hydraulically controllable friction clutches. Consequently the moment of inertia is also smaller. The control times of the clutch are therefore very short, in consequence of the liquid spaces in the clutch being very small.

Advantageously, one of the rotationally movable members is provided as a driving shaft, upon which one of the boundary pieces for the clamping sleeve is arranged as a hub which is rotationally fast with, an end-face flange, the second boundary piece being secured rotationally fast upon the hub as a flange ring by means of keyways and a nut. The other rotationally movable member, as a driven member, is here arranged as a cylindrical tappet body, slidable upon the driving shaft, and with its internal wall surface lying centrally over the tappet segments.

For the releasing, after the coupling operation, there are advantageously provided, on the periphery of the annularly arranged tappet segments, lying in grooves, releasing springs opposing the clamping pressure.

BRIEF DESCRIPTION OF THE DRAWINGS

The invention will now be further explained with reference to the accompanying drawings, in which:

FIG. 4 shows a view of the friction clutch with the driven member removed.

DETAILED DESCRIPTION OF THE DRAWINGS

Figure 1:
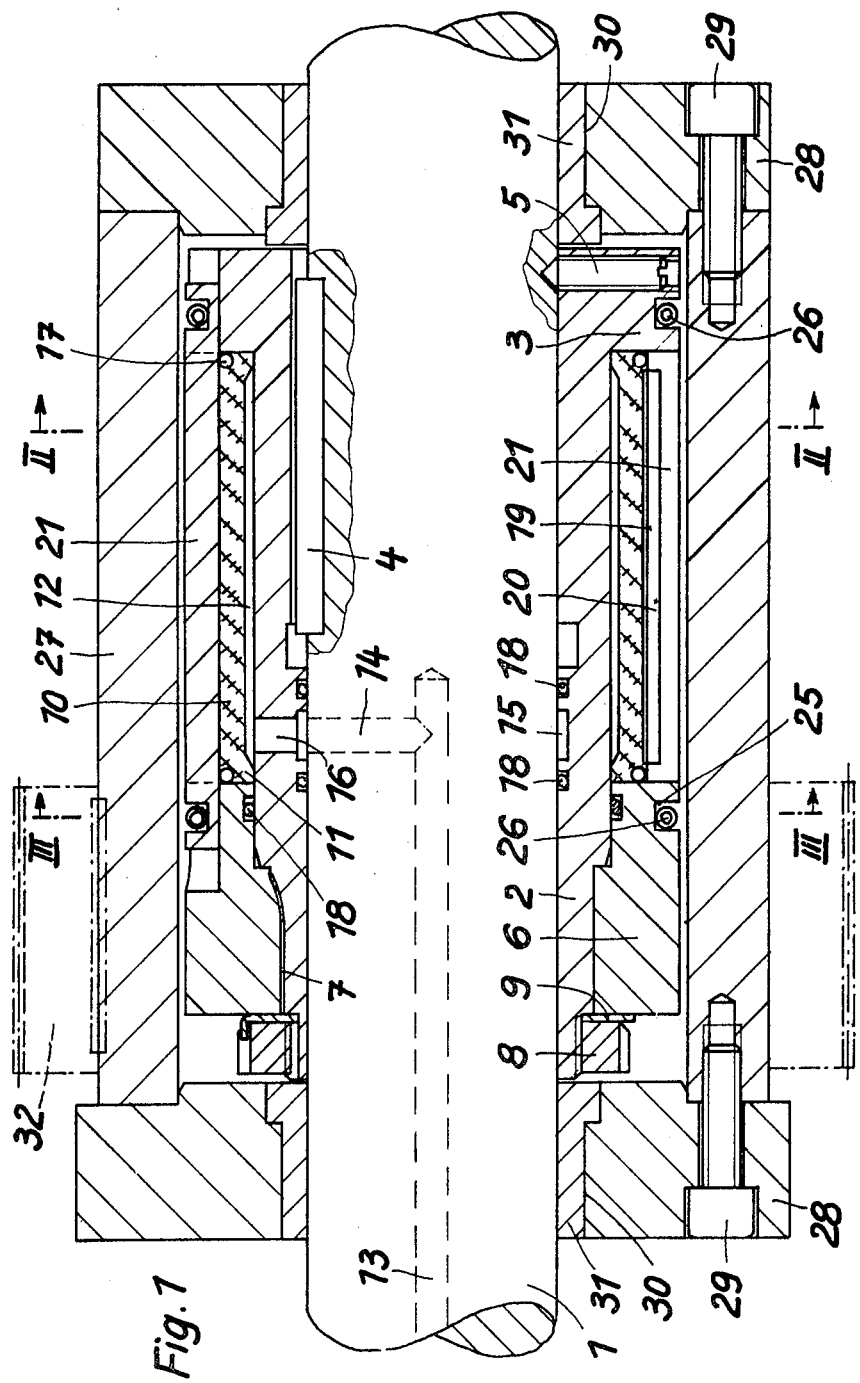
FIG. 1 shows a longitudinal section through a hydraulically controllable friction clutch on the line I—I in FIG. 2 in the direction of the arrows.

Upon a driving shaft 1, as a casing for the clamping means, is arranged a hub 2, with a flange 3 located on one end face. This hub is rendered rotationally fast on the driving shaft by means of a fitting key 4, and axially undisplaceable by means of a screw 5. To the end of the hub 2 remote from the flange 3 a flange ring 6 is secured rotationally fast by means of keyways 7 and a nut 8. The nut 8 is secured against loosening by a locking plate or tab washer 9. The space between the flange 3 and the flange ring 6 is filled up by a cylindrical resilient clamping sleeve 10, which, bearing with sealing lips 11 upon the driving shaft 1 or on the hub 2 and against the flange 3 and the flange ring 6, forms, with the driving shaft 1 or the hub 2, an annular chamber 12.

Through the driving shaft 1 there passes, for the purpose of supplying liquid under pressure to the annular chamber 12, an axial bore 13 and a transverse bore 14. Over the transverse bore 14 there is provided, on the inside of the hub 2, an annular chamber 15, from which one or more transverse bores 16 extend through the hub 2 to the annular chamber 12 formed with the clamping sleeve 10. In the outwardly directed end faces of the clamping sleeve 10 are embedded helical springs 17.

To guard against leakage of pressure liquid, sealing sleeves or collars 18 are provided on the one hand between the hub 2 and the flange ring 6, and on the other hand to the right and left of the annular chamber 15 in the hub 2.

Figure 2:
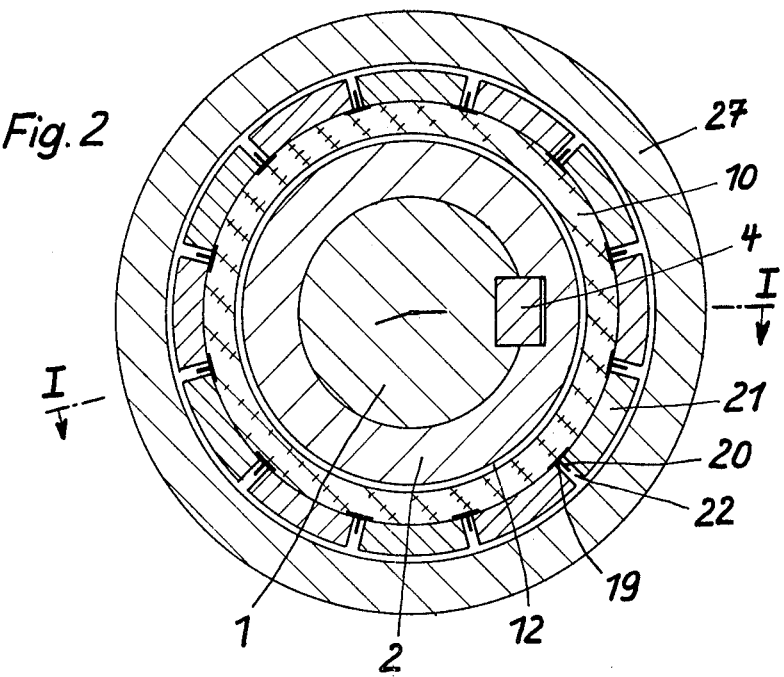
FIG. 2 shows a cross section on the line II—II in FIG. 1 the view looking in the direction of the arrows.
Figure 3:
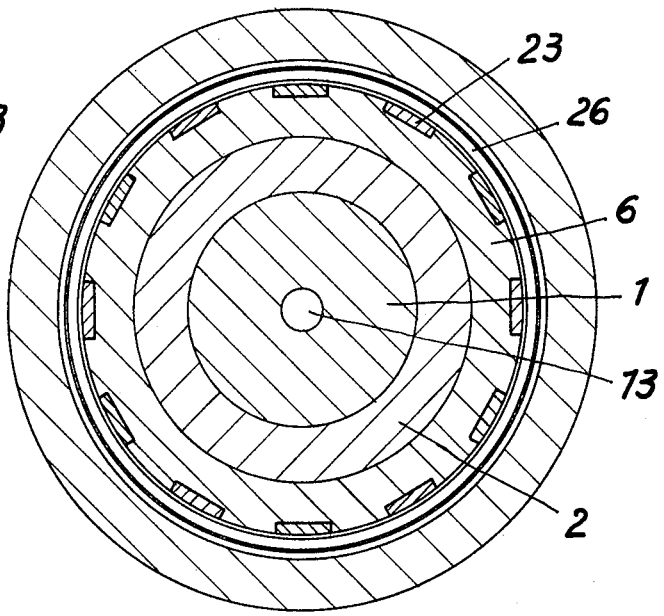
FIG. 3 shows a cross section on the line III—III in FIG. 1, the view looking in the direction of the arrows.

Cast on or secured to the outside of the clamping sleeve 10 there are longitudinally extending T-shaped sections 19, the web 20 of which extends outwards. Between these webs 20 are provided clamping segments 21, bearing annularly on the clamping sleeve 10, as shown in FIG. 2. The segments 21 are separated by longitudinal gaps 22, with their end faces being constructed as driving tappets or catches. These tappets 23 (FIG. 3) are shaped like fitting keys, and engage, so as to be radially movable, in corresponding recesses 24 (FIG. 4) formed as grooves, in the outsides of the flange 3 and of the flange ring 6.

The tappets 23, and the portions of the flange 3 and of the flange ring 6 located between the recesses 24, comprise, on their outside, peripheral grooves 25, in which are located annular releasing springs 26, resisting the outwardly directed clamping pressure.

Centrally over the tappet segments 21 there lies a cylindrical tappet body 27, to each of the end faces of which a flange ring 28 is secured by means of screws 29. In bores 30 in the flange ring 28 are arranged sliding bearings 31, which slide upon the driving shaft 1. Upon the tappet body 27 there may be arranged a toothed wheel 32, by way of which the off-drive from the driving shaft 1 is effected.

The method of operation of the clutch is as follows: Through a rotational connection, (not shown) pressure liquid is supplied to the driving shaft 1, and passes by way of the bores 13 and 14 located in the driving shaft 1, and by the bore 16, into the annular chamber 12 inside the resilient clamping sleeve 10. In consequence of the radial expansion of the clamping sleeve 10, the clamping segments 21 located on its external periphery are pressed against the inside of the tappet body 27. Under these circumstances, the torque issuing from the driving shaft 1 is transmitted, by way of the hub 2, the flange 3 and the flange ring 6, and the recesses 24 located therein, to the tappets 23 of the clamping segments 21, and is transmitted from these, by the frictional connection, to the tappet body 27.

The closing of the clutch may be effected with the driving shaft 1 either stationary or running. Upon the side of the clamping segments 21 facing the tappet body 27 there may be provided additional frictional coatings or corresponding pairings with the tappet body 27.

The construction of the invention is not restricted to a clutch, but is equally applicable to brakes.

I claim:

1. A hydraulically controlled radially adjustable friction clutch or brake for clamping together two members that are rotatable relatively to one another, comprising: a cylindrical body surrounding the first of the members to be clamped, a cylindrical boundary piece in the form of a flange on one end of said cylindrical body, also surrounding said member to be clamped, a second cylindrical boundary piece surrounding the other end of said cylindrical body, a cylindrical resilient clamping sleeve, carried by said cylindrical body and extending coaxially between the two cylindrical boundary pieces, said cylindrical body and resilient clamping sleeve enclosing therebetween an annular chamber, means for introducing liquid under pressure into said annular chamber, clamping segments annularly arranged, with longitudinal gaps therebetween, on that side of the clamping sleeve that faces the wall surface of the second of the two members to be clamped said boundary pieces being formed with recesses and said resilient clamping segments bearing axially at their ends against the boundary pieces, and being formed at their ends with tappets which engage in a radially movable manner in said recesses, said boundary pieces being connected rotationally fast with the first of the members to be clamped together, and T-shaped sections, the webs of which are interposed in the gaps between the tappet segments while their flanges bear upon the resilient clamping sleeve, thus closing the gaps on that side.

2. The hydraulically controlled friction clutch or brake as claimed in claim 1, the recesses in the boundary pieces are in the form of keyways, and tappets engaging therein are in the form of fitting keys.

3. The hydraulically controlled friction clutch or brake as claimed in claim 1, in which the first of the members to be clamped together is a driving shaft, the cylindrical boundary piece in the form of a flange is a hub rotationally fast on said shaft, and the other boundary piece is secured rotationally fast on said hub by means of keyways and a nut.

4. The hydraulically controlled friction clutch or brake as claimed in claim 1, in which the second of the rotatable members to be clamped is a cylindrical slidable driven member, the internal wall surface of which is located centrally over the clamping segments on the driving shaft.

5. The hydraulically controlled friction clutch or brake as claimed in claim 1, in which the clamping segments are formed with peripheral grooves, and releasing springs located in said grooves and opposing the clamping pressure.

* * * * *